(12) United States Patent
Nemoto

(10) Patent No.: US 11,656,425 B2
(45) Date of Patent: May 23, 2023

(54) OPTICAL DEVICE AND OPTICAL MEASURING MACHINE

(71) Applicant: MITUTOYO CORPORATION, Kawasaki (JP)

(72) Inventor: Kentaro Nemoto, Mito (JP)

(73) Assignee: Mitutoyo Corporation, Kawasaki (JP)

( * ) Notice: Subject to any disclaimer, the term of this patent is extended or adjusted under 35 U.S.C. 154(b) by 441 days.

(21) Appl. No.: 17/071,419

(22) Filed: Oct. 15, 2020

(65) Prior Publication Data
US 2021/0116668 A1 Apr. 22, 2021

(30) Foreign Application Priority Data

Oct. 21, 2019 (JP) .............................. JP2019-192067

(51) Int. Cl.
*G02B 7/02* (2021.01)
*G02B 27/30* (2006.01)
*G01B 11/245* (2006.01)

(52) U.S. Cl.
CPC ............ *G02B 7/021* (2013.01); *G01B 11/245* (2013.01); *G02B 27/30* (2013.01)

(58) Field of Classification Search
CPC ........ G02B 7/021; G02B 27/30; G02B 7/023; G02B 19/0052; G02B 7/02; G01B 11/245; G01B 11/2518; G01B 11/24
USPC .................................................. 356/601–624
See application file for complete search history.

(56) References Cited

U.S. PATENT DOCUMENTS

| | | | |
|---|---|---|---|
| 10,509,213 B1 * | 12/2019 | Monari ................ | G02B 15/163 |
| 2005/0094234 A1 * | 5/2005 | Miyatake ............. | G02B 26/125 |
| | | | 359/220.1 |
| 2007/0058133 A1 * | 3/2007 | Totani ................ | G03B 21/2073 |
| | | | 348/E5.143 |
| 2007/0165134 A1 * | 7/2007 | Hama ...................... | G02B 7/08 |
| | | | 348/370 |
| 2010/0231923 A1 * | 9/2010 | Ge ........................ | G01M 11/025 |
| | | | 356/601 |
| 2016/0097902 A1 * | 4/2016 | Shaw ..................... | G02B 6/322 |
| | | | 385/33 |
| 2017/0343923 A1 * | 11/2017 | Lim ........................ | G02B 7/021 |
| 2019/0137853 A1 * | 5/2019 | Takehana ................. | G02B 7/04 |

FOREIGN PATENT DOCUMENTS

JP 2012-212009 11/2012

* cited by examiner

*Primary Examiner* — Isiaka O Akanbi
(74) *Attorney, Agent, or Firm* — Rankin, Hill & Clark LLP

(57) ABSTRACT

An optical device includes a first lens holder holding a collimating lens, a second connector block supporting the first lens holder, a second lens holder supporting a light-forming lens, a pillar-shaped roller interposed between the second connector block and the second lens holder and disposed along an X-axis direction, and a pair of adjuster screws disposed across an optical axis in a Y-axis direction, the second lens holder and the second connector block being fixed with each other by the adjuster screws. Mutually facing end faces of the second connector block and the second lens holder are provided with respective V-shaped grooves extending along the X-axis direction, the roller being interposed between the V-shaped grooves. Each of the adjuster screws includes a head engaged with the second lens holder in a manner capable of relative movement in the X-axis direction and a shaft screwed into the second connector block.

4 Claims, 15 Drawing Sheets

OPTICAL DEVICE AND OPTICAL MEASURING MACHINE

The entire disclosure of Japanese Patent Application No. 2019-192067 filed Oct. 21, 2020 is expressly incorporated by reference herein.

TECHNICAL FIELD

The present invention relates to an optical device and an optical measuring machine.

BACKGROUND ART

An optical measuring machine, which is configured to illuminate a workpiece with a line laser beam and capture an image of a reflected light from the workpiece to measure a profile of the workpiece, has been known (see, for instance, Patent Literature 1 (JP 2012-212009 A)). Such an optical measuring machine includes an optical device including a light source, a collimating lens for converting a laser beam emitted by the light source into a collimated beam, and a light-forming lens (e.g. a rod lens or a cylindrical lens) for converting the collimated beam into the line laser beam.

When the incident direction of the collimated beam on the light-forming lens of the above-described optical device is deviated, the resultant line laser beam assumes a curved profile. When the workpiece is illuminated with the curved line laser beam, a flat surface of the workpiece is incorrectly measured as an irregular surface. In other words, the deviation in the incident direction of the collimated beam on the light-forming lens results in measurement errors.

In view of the above, the optical device disclosed in Patent Literature 1 includes an optical-system adjuster configured to adjust the incident direction of the collimated beam onto the light-forming lens. The optical-system adjusting mechanism, which includes a holder for holding the light-forming lens, a block fixed to the holder, and a cylindrical member interposed between the holder and the block, can adjust an inclination of the holder with respect to the block by a pivotal movement around the cylindrical member. By adjusting the inclination of the holder holding the light-forming lens, the incident direction of the collimated beam onto the light-forming lens can be adjusted and, consequently, the shape of the line laser beam can be adjusted into a linear shape.

It should be noted that, in order to improve the accuracy of the profile measurement using the line laser beam, not only the linear shape of the line laser beam but also even light intensity distribution of the line laser beam is important. The light intensity distribution of the line laser beam is dependent on an incident position of the collimated beam onto the light-forming lens, where the resultant line laser beam has even light intensity distribution on condition that the collimated beam enters the center of the light-forming lens.

However, the optical device disclosed in the above-described Patent Literature 1 does not include a mechanism for adjusting the incident position of the collimated beam onto the light-forming lens. Accordingly, the deviation in the incident position, when occurred, results in uneven light intensity distribution of the line laser beam, resulting in deterioration in the measurement accuracy.

SUMMARY OF INVENTION

An object of the invention is to provide an optical device capable of forming a linear line laser beam having an even light intensity distribution, and an optical measuring machine provided with the optical device.

An optical device according to an aspect of the invention includes: a light source configured to emit a laser beam; a collimating lens configured to convert the laser beam received from the light source into a collimated beam; a light-forming lens configured to convert the collimated beam received from the collimating lens into a line laser beam widened in a line direction orthogonal to an optical axis of the collimating lens; a first lens holder holding the collimating lens; a connector block supporting the first lens holder; a second lens holder supporting the light-forming lens; a pillar-shaped roller interposed between the connector block and the second lens holder and disposed along the line direction; and a pair of adjuster screws disposed across the optical axis in an orthogonal direction orthogonal to the optical axis and the line direction, the second lens holder and the connector block being fixed with each other by the adjuster screws, in which mutually facing end faces of the connector block and the second lens holder are each provided with respective V-shaped grooves extending along the line direction, the V-shaped grooves being disposed with the roller being interposed therebetween, and the adjuster screws each include a head engaged with the second lens holder in a manner capable of relative movement in the line direction and a shaft screwed with the connector block.

In the above aspect of the invention, the end faces of the connector block and the second lens holder are disposed to face each other and the V-shaped grooves are provided to respective end faces with the pillar-shaped roller being interposed therebetween. Accordingly, an inclination of the second lens holder with respect to the second connector block around the roller can be adjusted by adjusting the screwed depths of the pair of adjuster screws. By adjusting the inclination of the second lens holder holding the light-forming lens, an incident direction of the collimated beam onto the light-forming lens and, consequently, the shape of the line laser beam can be adjusted.

Further, the pair of adjuster screws fix the second lens holder to the second connector block in a manner that the second lens holder is movable in the line direction. Accordingly, the second lens holder is stably movable in the line direction irrespective of the inclination with respect to the connector block by moving the second lens holder along a side surface of the roller. Thus, the incident position of the collimated beam onto the light-forming lens and, consequently, the light intensity distribution of the line laser beam can be adjusted.

Accordingly, the optical device of the above aspect of the invention can form the linear line laser beam having even light intensity distribution.

In the optical device according to the above aspect of the invention, it is preferable that the second lens holder is provided with holes or slits for receiving the shafts of the adjuster screws, and the holes or the slits each have a dimension in the line direction larger than a dimension in the orthogonal direction.

With the above arrangement, the second lens holder, which is kept from dropping off by the engagement of the shafts of the adjuster screws with the holes or the slits, can be appropriately moved in the line direction with respect to the connector block.

In the optical device according to the above aspect of the invention, it is preferable that the first lens holder is a hollow cylindrical component internally holding the collimating lens, and the connector block slidably supports an outer circumferential surface of the first lens holder to be rotatable around the optical axis.

With the above arrangement, the line direction, in which the line laser beam is widened (i.e. the image of the laser beam is stretched), can be adjusted as desired. For instance, when the workpiece is scanned in a predetermined scanning direction, the workpiece can be efficiently measured by aligning the line direction with a direction orthogonal to the scanning direction.

An optical measuring machine according to another aspect of the invention includes: any of the above-described optical devices, the optical device irradiating the workpiece with the line laser beam; an image capturing unit configured to capture an image of a reflected light of the line laser beam reflected by the workpiece, and a measuring unit configured to measure a profile of the workpiece based on the image captured by the image capturing unit.

According to the above aspect of the invention, the workpiece, which is illuminated with the linear line laser beam having even light intensity distribution, can be measured with improved measurement accuracy.

BRIEF DESCRIPTION OF DRAWING(S)

FIG. 1 is a block diagram showing an optical measuring machine according to an exemplary embodiment of the invention.

FIG. 2 schematically shows an optical probe according to the exemplary embodiment.

DESCRIPTION OF EMBODIMENT(S)

Figure 1:
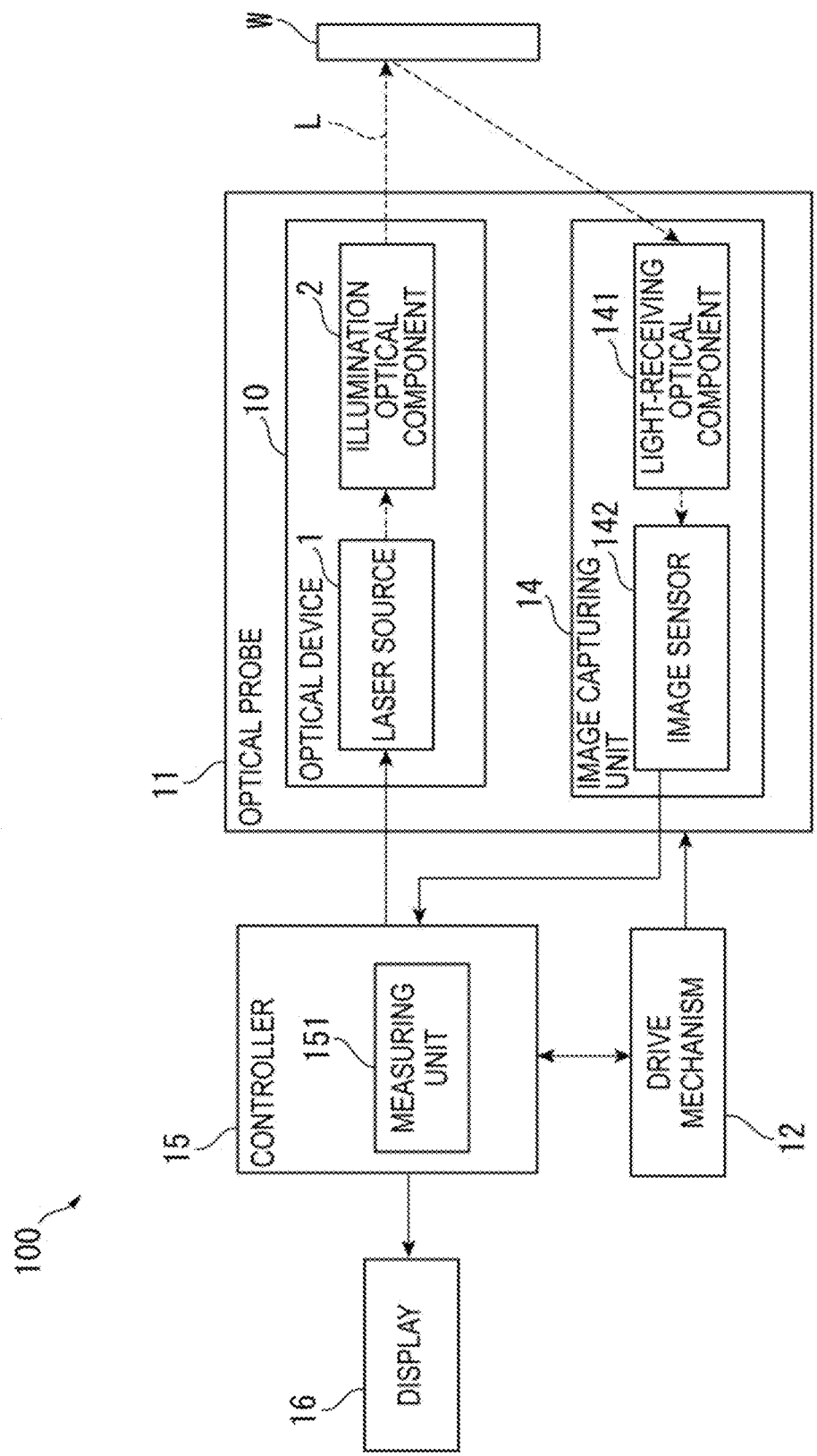

An exemplary embodiment of the invention will be described below with reference to attached drawings.
Optical Measuring Machine As shown in FIG. 1, an optical measuring machine 100 according to the present exemplary embodiment includes: an optical probe 11 configured to illuminate a workpiece W with a line laser beam L to capture an image; a drive mechanism 12 configured to support the optical probe 11 so that the optical probe 11 is movable with respect to the workpiece W; and a controller 15 configured to measure a profile of the workpiece W based on the captured image.

The optical probe 11 includes an optical device 10 configured to illuminate the workpiece W with the line laser beam L and an image capturing unit 14 configured to take an image of a reflected light from the workpiece W.

Figure 2:
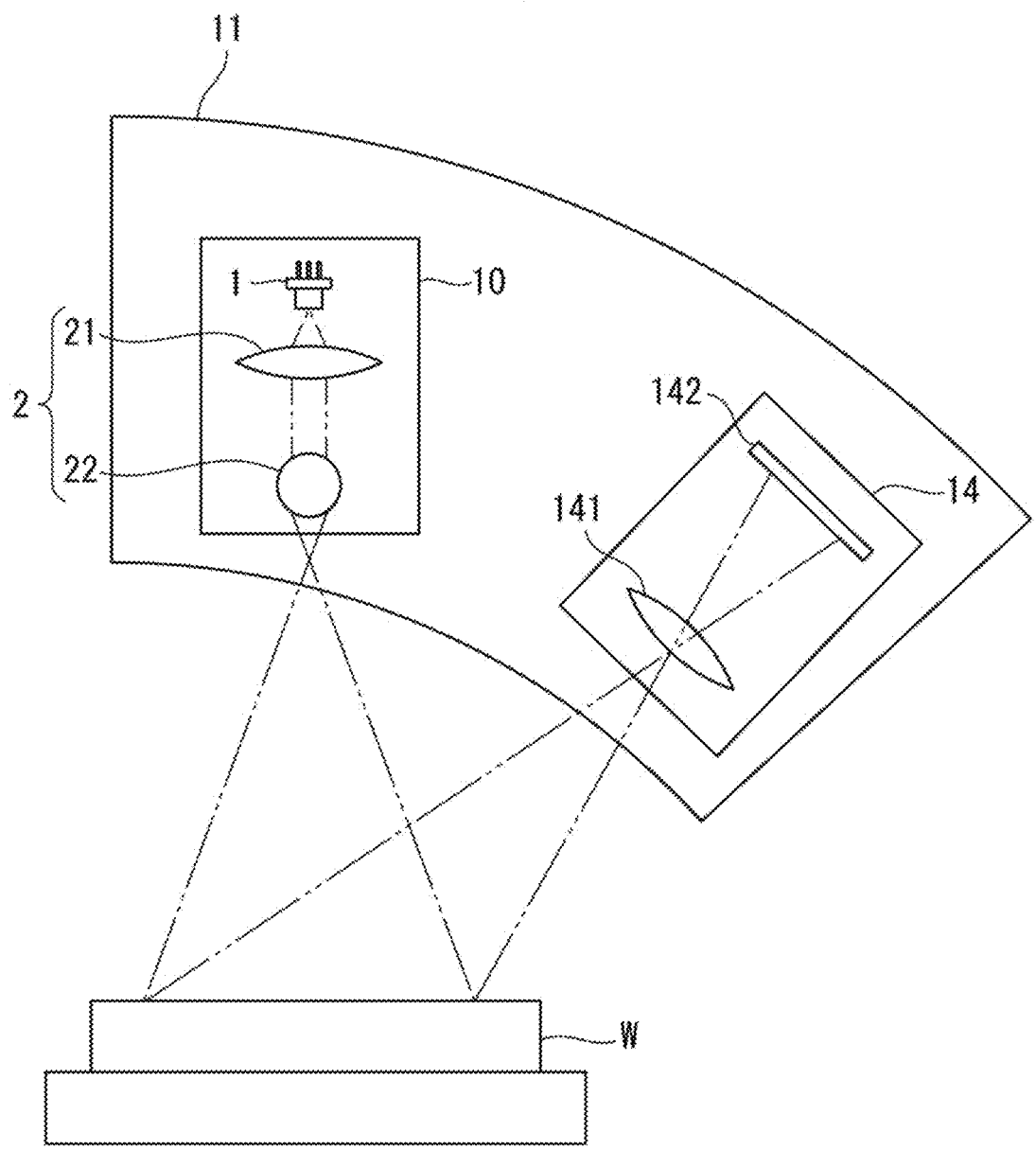

As shown in FIG. 2, the optical device 10 includes a laser source 1 and an illumination optical component 2.

The laser source 1, example of which is a laser diode, is configured to emit a laser beam.

The illumination optical component 2 includes: a collimating lens 21 configured to convert the laser beam received from the laser source 1 into a collimated beam and to output the collimated beam; and a light-forming lens 22 configured to convert the collimated beam received from the collimating lens 21 into the line laser beam L and to output the line laser beam. Examples of the light-forming lens 22 include a rod lens and a cylindrical lens. The line laser beam L emitted from the light-forming lens 22 illuminates the workpiece W.

The image capturing unit 14 (e.g. a camera) includes a light-receiving optical component 141 and an image sensor 142.

The light-receiving optical component 141 is configured to form an image of the line laser beam L reflected by the workpiece W on the image sensor 142. It should be noted that the light-receiving optical component 141 schematically shown in FIG. 2 as a single lens may alternatively be a combination of a plurality of lenses.

The image sensor 142, example of which is an image pickup device (e.g. CMOS and CCD), is configured to capture the image of the line laser beam L reflected by the workpiece W to form an image.

Referring back to FIG. 1, the controller 15, which includes, for instance, a memory and CPU (Central Processing Unit), is configured to achieve various functions by the CPU reading and running the programs stored in the memory.

For instance, the controller 15 is configured to adjust light intensity of the light beam emitted by the laser source 1 by controllably driving the drive mechanism 12 to control the position of the optical probe 11 with respect to the workpiece W and/or by controlling the laser source 1.

Further, the controller 15 also serving as a measuring unit 151 is configured to import the image captured by the image sensor 142 and measure a surface profile of the workpiece W illuminated with the line laser beam L through arithmetic processing in accordance with a triangulation method.

It should be noted that a display 16 may be connected to the controller 15. The display 16 is configured to display measurement results calculated by the measuring unit 151, and the like.
Optical Device Subsequently, specific arrangement of the optical device 10 will be described below with reference to FIGS. 3 to 6.

In the description below, a direction along an optical axis P of the optical device 10 is defined as a Z-axis direction, and two directions in a plane orthogonal to the Z-axis direction are defined as X-axis direction and Y-axis direction, the X-axis direction and Y-axis direction being orthogonal to each other. Further, a first side in the Z-axis direction is sometimes referred to as a +Z-axis side, while a second side opposite the first side is sometimes referred to as a −Z-axis side.

Figure 3:
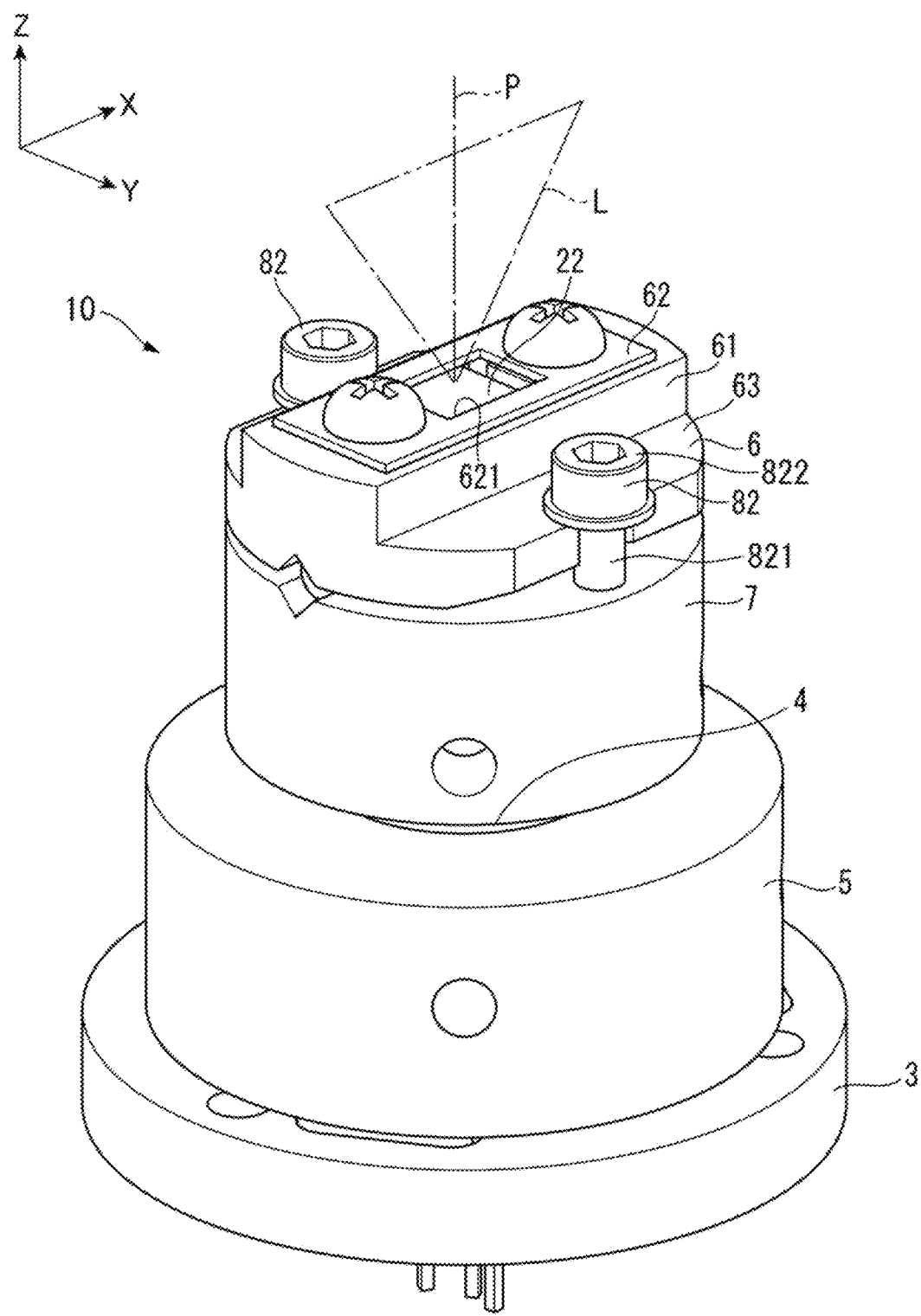
FIG. 3 is a perspective view showing an optical device according to the exemplary embodiment.
Figure 4:
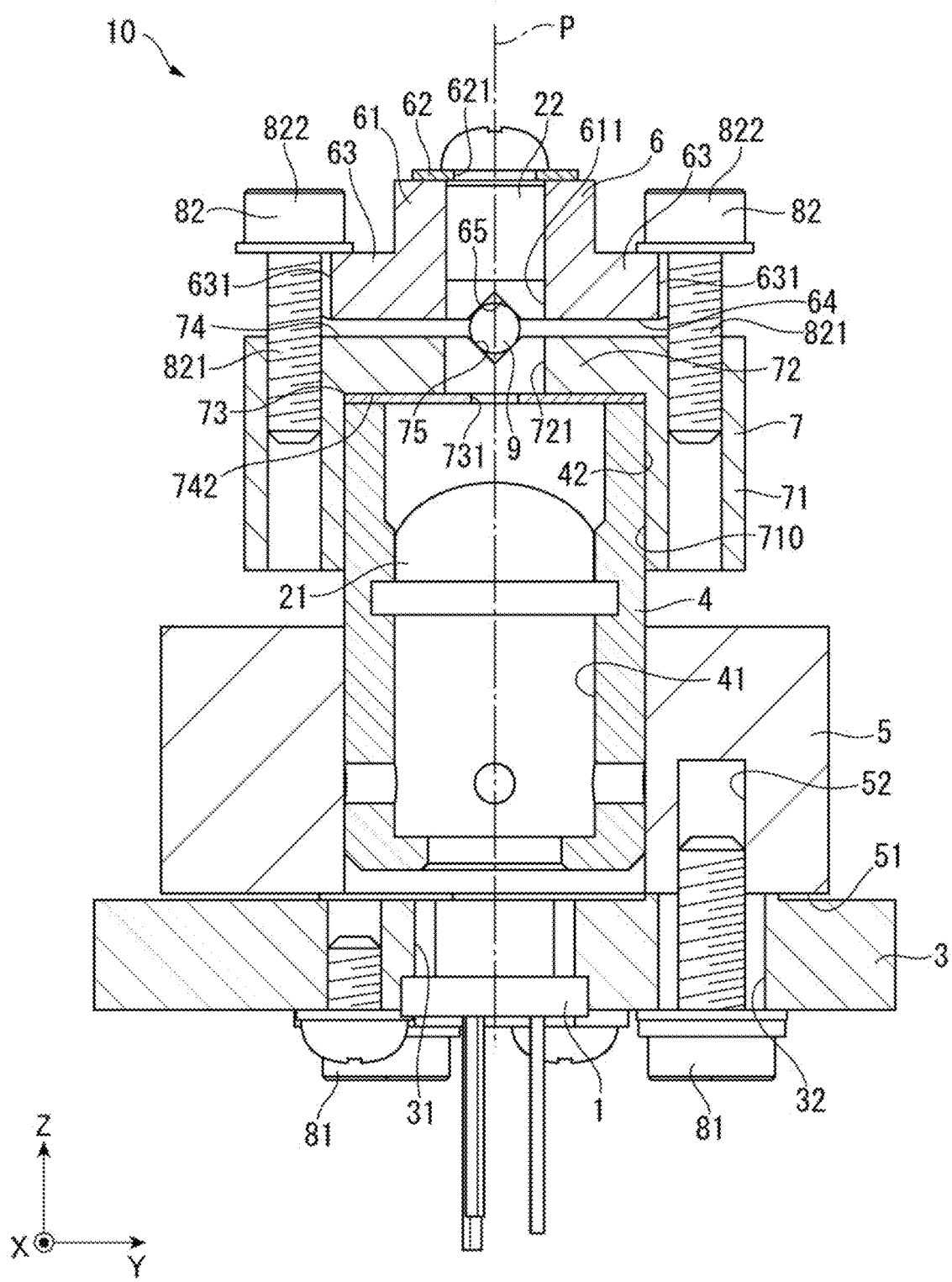
FIG. 4 is a cross-sectional view showing the optical device according to the exemplary embodiment.

As shown in FIGS. 3 and 4, the optical device 10 includes the above-described laser source 1, collimating lens 21, and light-forming lens 22. The optical device 10 further includes: a mount 3 for holding the laser source 1; a first lens holder 4 for holding the collimating lens 21; a first connector block 5 for connecting the mount 3 with the first lens holder 4; a second lens holder 6 for holding the light-forming lens 22; and a second connector block 7 (a connector block of the invention) for connecting the first lens holder 4 with the second lens holder 6.

The mount 3 is a disk-shaped component provided with a hole 31 whose center is aligned with the optical axis P. The laser source 1 is received in the hole 31 of the mount 3 and configured to emit the laser beam toward the +Z-axis side.

The first lens holder 4 is a hollow cylindrical component configured to internally hold the collimating lens 21. Specifically, the first lens holder 4 is provided with a cross-sectionally circular hole 41 whose center is aligned with the optical axis P, a peripheral edge of the collimating lens 21 being held by a wall surface of the hole 41. The collimating lens 21 is configured to convert the laser beam received from the −Z-axis side into the collimated beam, and outputs the collimated beam toward the +Z-axis side.

The first connector block 5 is a hollow cylindrical component that supports a circumferential surface of the first lens holder 4. An internal thread 52 is provided at an end face 51 of the first connector block 5 facing the mount 3. A fixing screw 81 is inserted through a hole 32 provided in the mount 3 to be screwed into the internal thread 52 of the first connector block 5, thereby connecting the mount 3 with the first connector block 5.

The second lens holder 6 includes: a lens supporter 61 that receives the light-forming lens 22; a cover portion 62 fixed to the lens supporter 61; and a pair of collars 63 extending from the lens supporter 61 toward both sides in the Y-axis direction.

The lens supporter 61, which is in a form of a holder configured to receive the light-forming lens 22, is provided with an optical path hole 611 whose center is aligned with the optical axis P. The light-forming lens 22 in the lens supporter 61 is configured to convert the collimated beam received from the −Z-axis side into the linear line laser beam L widening in the X-axis direction and to output the line laser beam L toward the +Z-axis side.

The cover portion 62, which is a plate-shaped component provided with an optical path hole 621 whose center is aligned with the optical axis P, is screwed to the lens supporter 61 to keep the light-forming lens 22 from dropping off.

The pair of collars 63, which are portions extending from the lens supporter 61 toward both sides in the Y-axis direction, each have smaller thickness in the Z-axis direction than that of the lens supporter 61.

The second lens holder 6 is provided with a holder end face 64 (end face of the second lens holder of the invention), which faces the second connector block 7 in a manner spaced from the second connector block 7 in the Z-axis direction. Specifically, the lens supporter 61 and the collars 63 of the second lens holder 6 define the holder end face 64 facing the second connector block 7.

It should be noted that the line laser beam L formed by the light-forming lens 22 held by the second lens holder 6 widens in the X-axis direction in the present exemplary embodiment. In other words, the X-axis direction of the present exemplary embodiment corresponds to a "line direction" of the invention.

Figure 5:
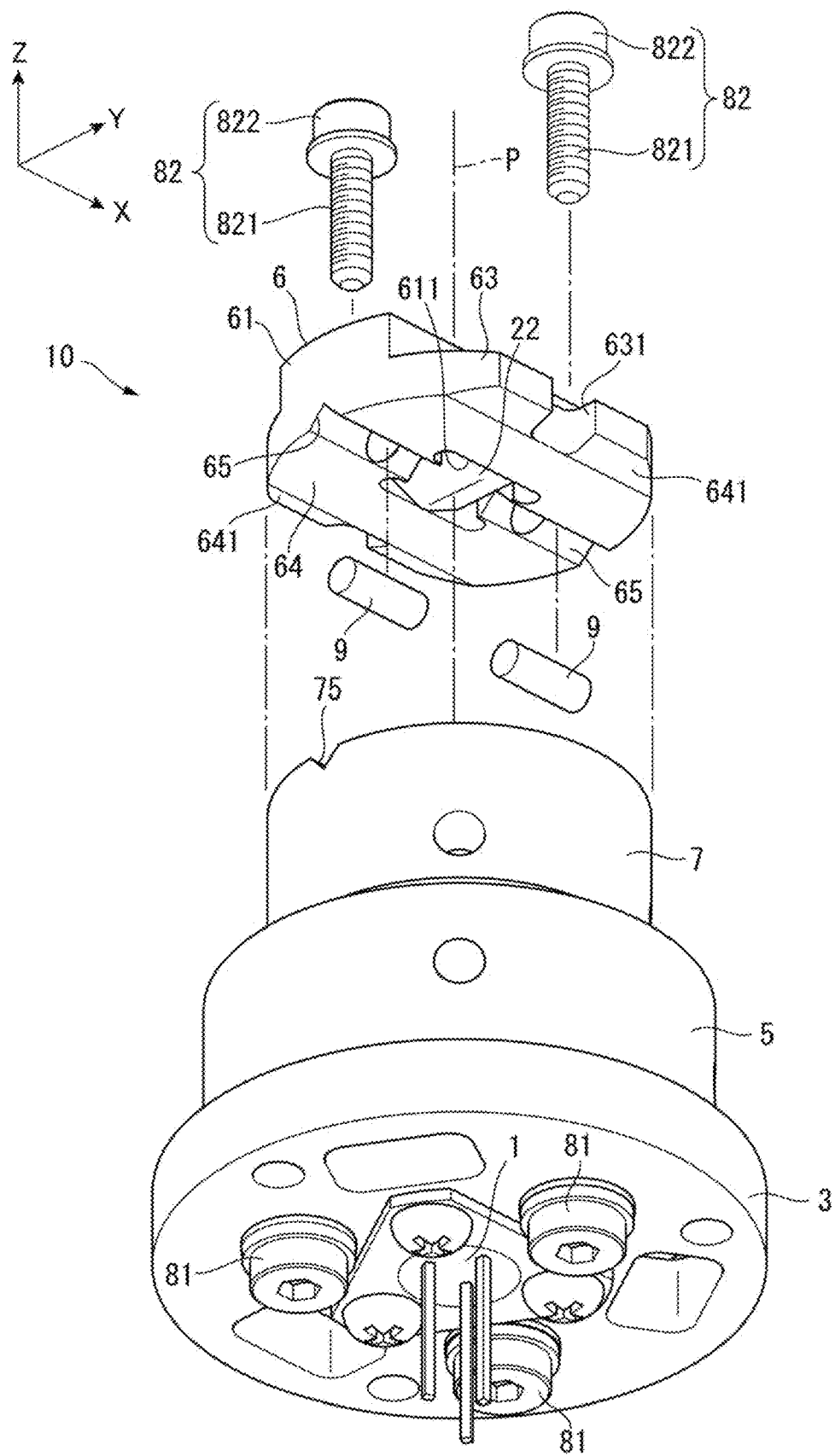
FIG. 5 is an exploded perspective view showing the optical device according to the exemplary embodiment.

As shown in FIG. 5, a groove 65 extending in the X-axis direction is formed in the holder end face 64. The groove 65 is formed on both sides of the optical path hole 721 in the X-axis direction (i.e. across the optical axis P in the X-axis direction). The groove 65, which is defined by two wall surfaces into a V-shape, has a triangular groove cross section.

The holder end face 64 additionally has a slant surface 641, which is slanted with respect to the block end face 74, on both ends in the Y-axis direction. The slant surface 641 is slanted in a manner that a distance from the block end face 74 increases as distanced from the optical axis P.

Referring back to FIG. 4, the second connector block 7 includes a cylindrical portion 71 for supporting the first lens holder 4 and a bottom portion 72 provided at a +Z-axis side of the cylindrical portion 71.

The cylindrical portion 71 is provided with a cross-sectionally circular hole 710 whose center is aligned with the optical axis P. A wall surface of the hole 710 is in slidable contact with an outer circumferential surface 42 of the first lens holder 4. Thus, the second connector block 7 is rotatable with respect to the first lens holder 4 around the optical axis P.

A disk-shaped slide member 73 with excellent slidability is interposed between the bottom portion 72 and the first lens holder 4. The bottom portion 72 and the slide member 73 are provided with optical path holes 721, 731, respectively, whose centers are aligned with the optical axis P.

Further, the second connector block 7 includes the block end face 74 (end face of the second connector block of the invention) facing the second lens holder 6. Specifically, an end of the cylindrical portion 71 and the bottom portion 72 of the second connector block 7 define the block end face 74 facing the second lens holder 6.

Figure 6:
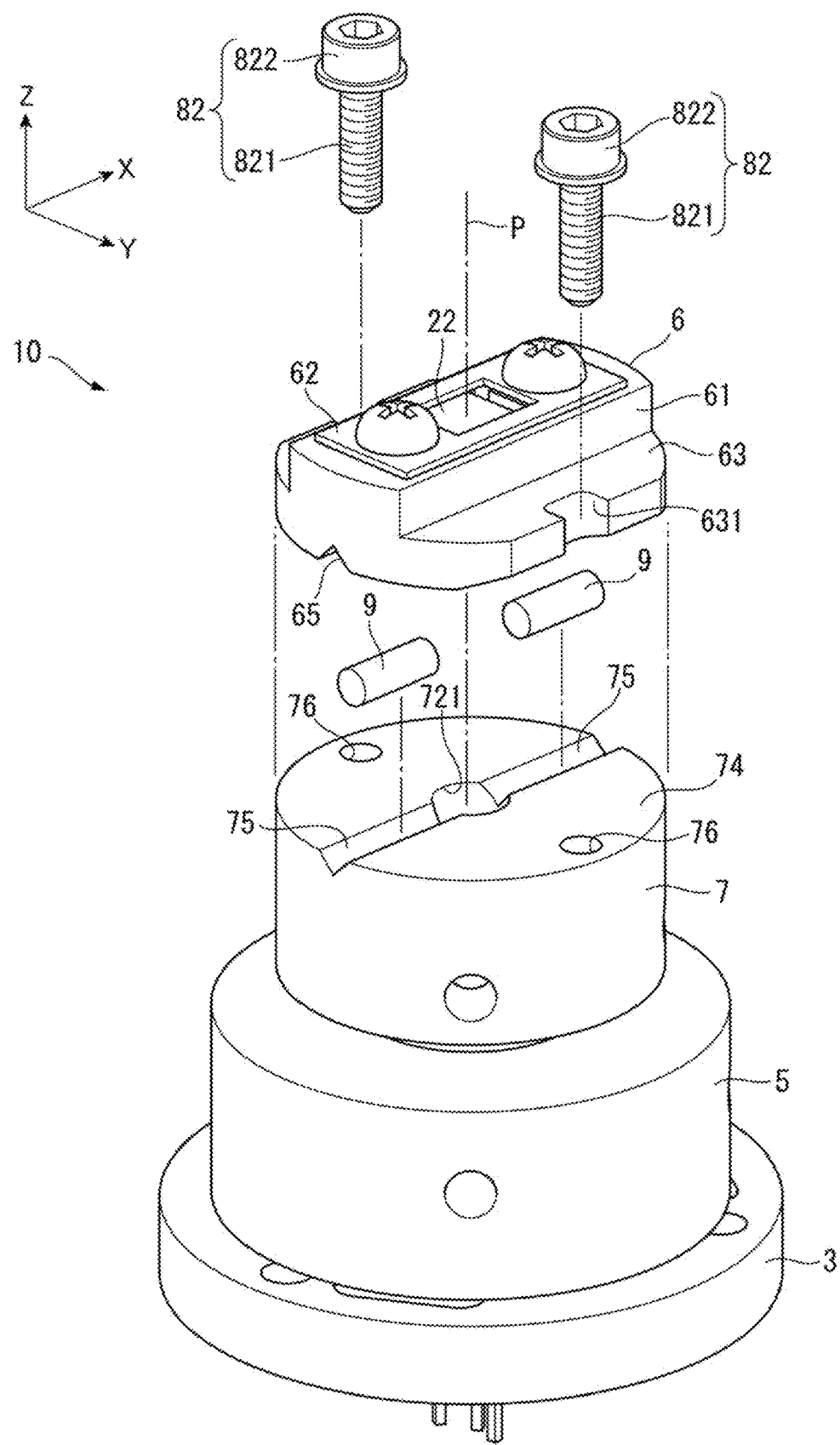
FIG. 6 is another exploded perspective view showing the optical device according to the exemplary embodiment.

As shown in FIG. 6, a groove 75 extending in the X-axis direction is formed in the block end face 74. The groove 75 is formed on both sides of the optical path hole 721 in the X-axis direction (i.e. across the optical axis P in the X-axis direction). The groove 75, which is defined by two wall surfaces into a V-shape, has a triangular groove cross section.

The optical device 10 additionally includes pillar-shaped rollers 9 interposed between the above-described second lens holder 6 and the second connector block 7, and a pair of adjuster screws 82 for fixing the second lens holder 6 and the second connector block 7 with each other.

The rollers 9 are disposed along the X-axis direction between the groove 65 of the second lens holder 6 and the groove 75 of the second connector block 7 across the optical axis P in the X-axis direction.

Referring again back to FIG. 4, an outer circumferential surface of each of the rollers 9 is in contact with the wall surfaces defining the groove 65 and the groove 75. Particularly, in the present exemplary embodiment, the outer circumferential surface of each of the rollers 9 is in mutually slidable contact with the wall surfaces defining the groove 65.

A gap is created between the second lens holder 6 and the second connector block 7 due to the presence of the roller 9.

The pair of adjuster screws 82 are disposed across the optical axis P in the Y-axis direction. Each of the adjuster screws 82 includes an externally threaded shaft 821 and a head 822 provided at an end of the shaft 821. The shaft 821 is inserted through corresponding one of slits 631 of the second lens holder 6 to be screwed with an internal thread 76 of the second connector block 7. The head 822 is engaged with the second lens holder 6 in a manner capable of relative movement in the Y-axis direction.

Each of the slits 631 of the second lens holder 6, which is formed in the pair of collars 63, is in a form of an oblong hole extending in the X-axis direction. Specifically, the slits 631 are designed so that a dimension in the X-axis direction becomes larger than a dimension in the Y-axis direction. The dimension of the slits 631 in the X-axis direction corresponds to a movable range of the second lens holder 6 (described later).

It should be noted that the slits 631 in the present exemplary embodiment each define a U-shaped groove whose edge is partially removed.

Optical Adjustment Method

The optical device 10 of the present exemplary embodiment is capable of adjusting the profile, inclination, and light intensity distribution of the line laser beam L. The adjustment methods of the line laser beam L will be described below.

Profile Adjustment

The optical device 10 of the present exemplary embodiment is capable of adjusting an inclination of the second lens holder 6 with respect to the second connector block 7 around the rollers 9 by adjusting screwed depths of the two adjuster screws 82 into the second connector block 7.

Figure 7:
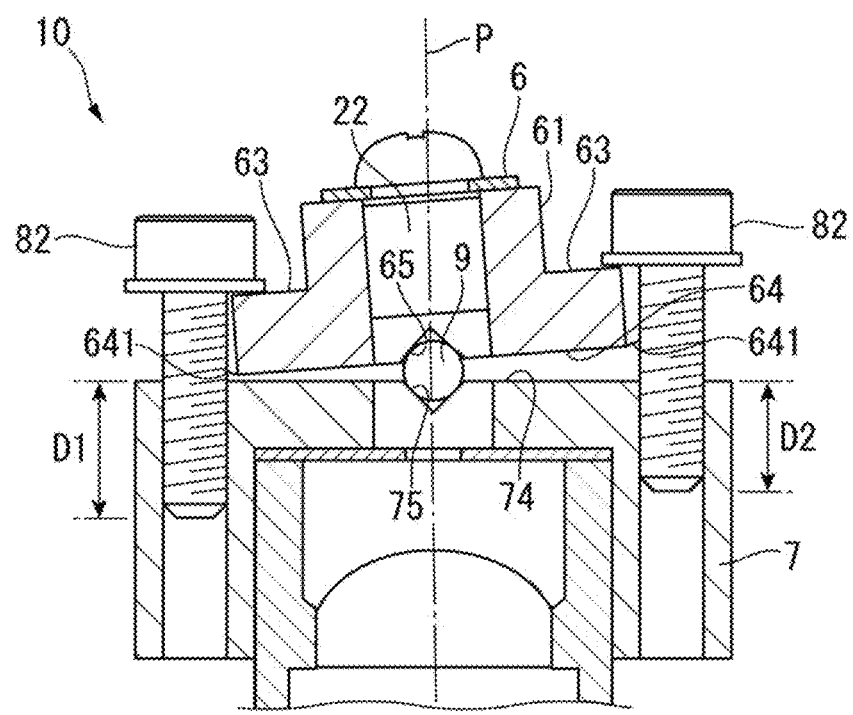
FIG. 7 illustrates an example of an adjustment method of the optical device according to the exemplary embodiment.

For instance, as shown in FIG. 7, when a screwed depth D1 of one of the adjuster screws 82 is increased and a screwed depth D2 of the other of the adjuster screws 82 is decreased, the one of the collars 63 of the second lens holder 6 comes close to the second connector block 7 (see left side in FIG. 7), and the other of the collars 63 of the second lens holder 6 goes away from the second connector block 7 (see the right side in FIG. 7).

By thus adjusting the inclination of the second lens holder 6, the inclination of the light-forming lens 22 held by the second lens holder 6 with respect to the optical axis P and, consequently, an incident direction of the collimated beam onto the light-forming lens 22 are adjusted.

Figure 9:
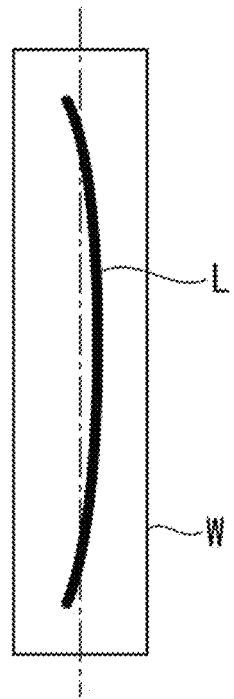
FIG. 9 shows another example of the shape of the line laser beam.
Figure 10:
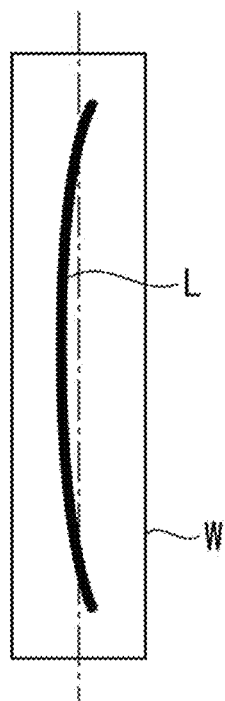
FIG. 10 shows still another example of the shape of the line laser beam.

The user examines the shape of the line laser beam L emitted by the optical device 10 and projected on, for instance, a flat surface of the workpiece W. When a curved line laser beam L as shown in FIG. 9 or 10 is observed, it is preferable that the screwed depths of the two adjuster screws 82 are adjusted until a linear line laser beam L as shown in FIG. 8 is observed.

Inclination Adjustment

The optical device 10 of the present exemplary embodiment is capable of adjusting a rotation position of the light-forming lens 22 around the optical axis P by adjusting a rotation position of the second lens holder 6 with respect to the first lens holder 4. Consequently, the degree of the inclination of the line laser beam L emitted by the optical device 10 (i.e. an extension direction (line direction) of the line laser beam L) is adjusted.

Figure 8:
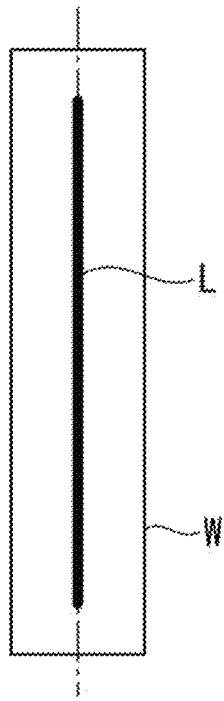
FIG. 8 shows an example of a profile of a line laser beam.
Figure 11:
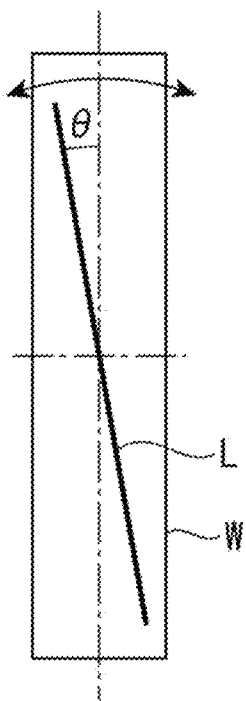
FIG. 11 shows further example of the shape of the line laser beam.
Figure 12:
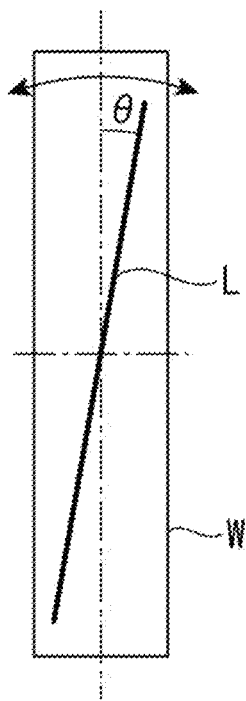
FIG. 12 shows still further example of the shape of the line laser beam.

For instance, when the inclination of the line laser beam L is to be adjusted to the state shown in FIG. 8, it is preferable to adjust the rotation position of the second lens holder 6 with respect to the first lens holder 4 until an inclination 8 of the line laser beam L as shown in FIG. 11 or 12 is eliminated.

Light Intensity Distribution Adjustment

The optical device 10 of the present exemplary embodiment is capable of adjusting a position of the second lens holder 6 in the X-axis direction with respect to the second connector block 7.

Figure 13:
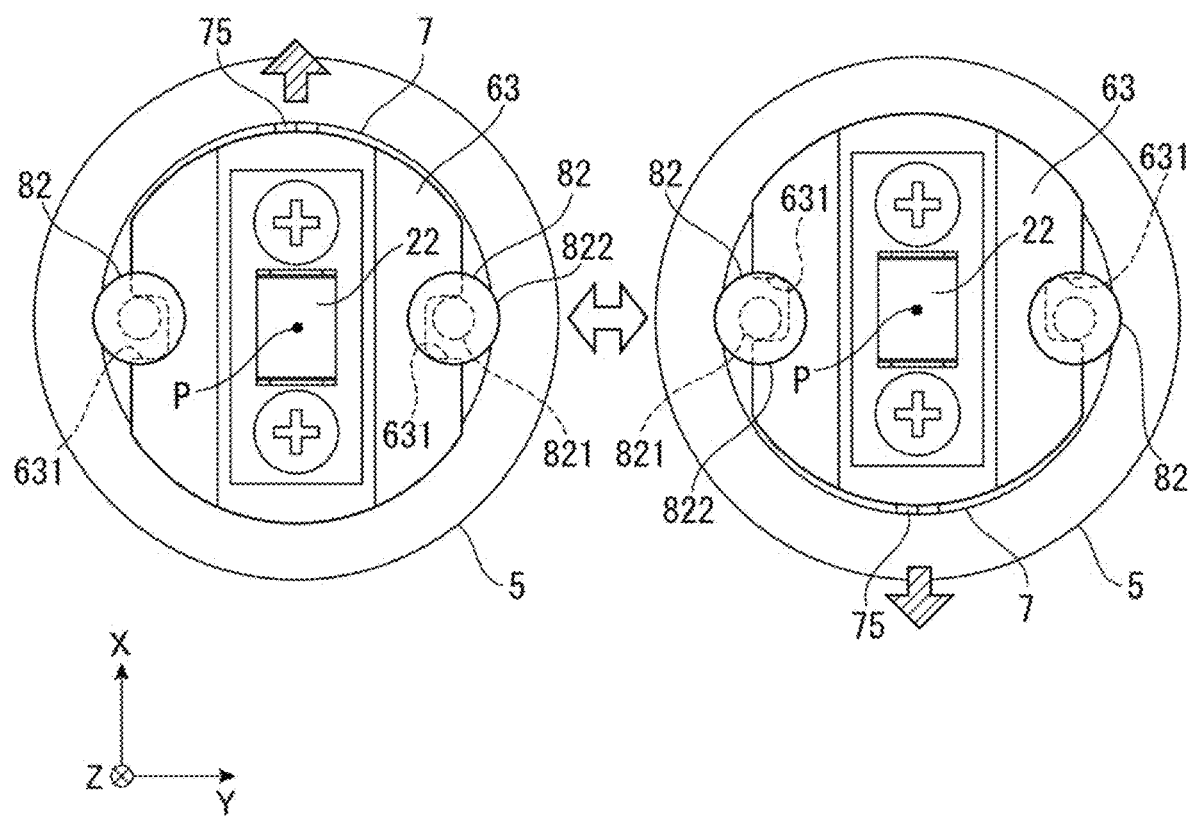
FIG. 13 illustrates the adjustment method of the optical device according to the exemplary embodiment.

For instance, by moving the second lens holder 6 to one side in the X-axis direction as shown in FIG. 13, the position in the X-axis direction of the light-forming lens 22 held by the second lens holder 6 with respect to the optical axis P and, consequently, an incident position of the collimated beam onto the light-forming lens 22 are adjusted.

It should be noted that, when the second lens holder 6 is moved, the second lens holder 6 slides with respect to the rollers 9 and the head 822 of each of the adjuster screws 82 (see, for instance, FIG. 4). The movable range of the second lens holder 6 corresponds to the range for the shafts 821 of the adjuster screws 82 to be moved within the slits 631 of the second connector block 7.

The user examines the light intensity distribution of the line laser beam L emitted from the optical device 10 using, for instance, a beam profiler.

Figure 14:
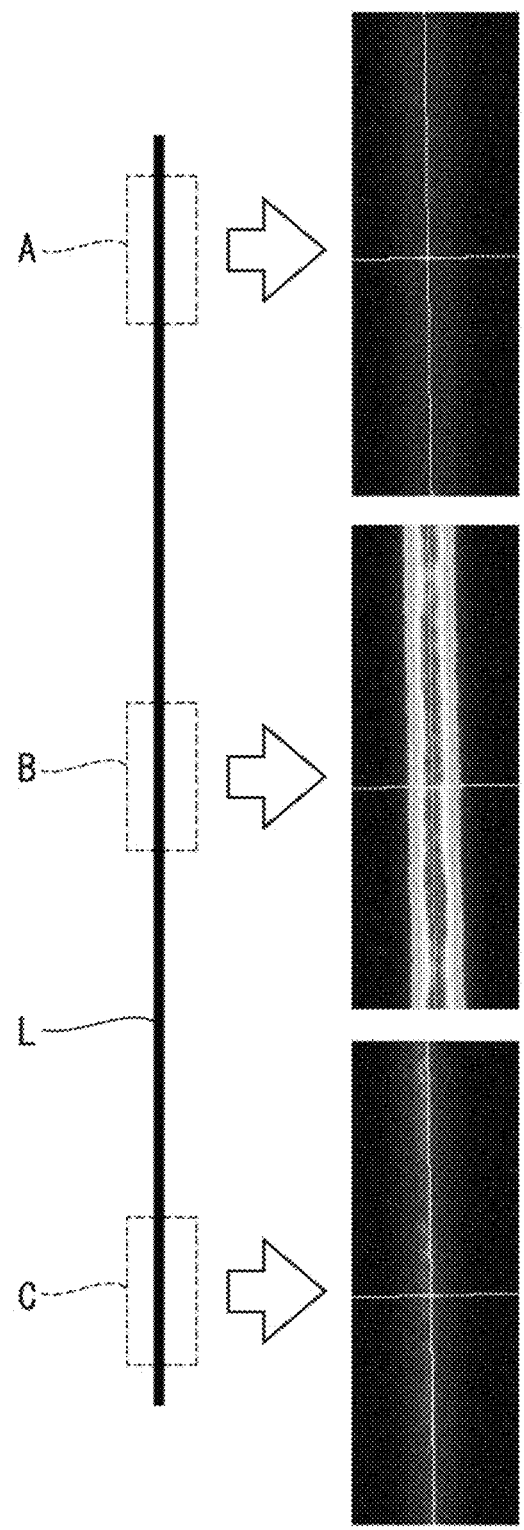
FIG. 14 shows an example of light intensity distribution of the line laser beam measured by a beam profiler.
Figure 15:
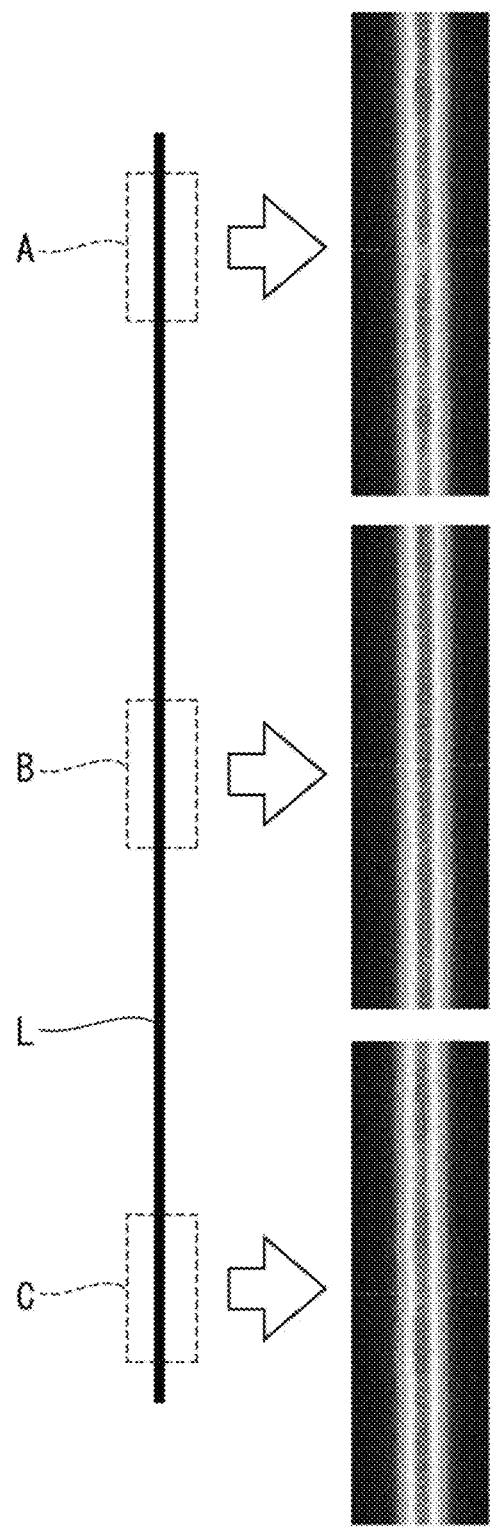
FIG. 15 shows another example of light intensity distribution of the line laser beam measured by a beam profiler.

For instance, FIGS. 14 and 15 show measurement results of the light intensity measured using a beam profiler at portions A to C of the line laser beam L (encircled by dotted lines). In FIG. 14, the light intensity is highest at the portion B located at the center of the line laser beam L and is low at the portions A, C on both sides of the portion B, showing uneven light intensity distribution of the line laser beam L. In contrast, FIG. 15 shows approximately the same level of the light intensity at the portions A to C of the line laser beam L (i.e. even light intensity distribution of the line laser beam L).

It is preferable for the user, who finds the results of the light intensity distribution of the line laser beam L as shown in FIG. 14, to adjust the position of the second lens holder 6 with respect to the second connector block 7 in the X-axis direction until the results shown in FIG. 15 are observed.

Advantage(s) of the Present Exemplary Embodiment

As described above, the optical device 10 of the present exemplary embodiment is capable of adjusting the inclination of the second lens holder 6 with respect to the second connector block 7 around the rollers 9 by adjusting the screwed depths of the pair of adjuster screws 82. By adjusting the inclination of the second lens holder 6 holding the light-forming lens 22, the incident direction of the collimated beam onto the light-forming lens 22 and, consequently, the shape of the line laser beam L can be adjusted.

Further, the pair of adjuster screws 82 fix the second lens holder 6 to the second connector block 7 in a manner that the second lens holder 6 is movable in the X-axis direction. Accordingly, the second lens holder 6 is stably movable in the X-axis direction irrespective of the degree of the inclination with respect to the second connector block 7 by moving the second lens holder 6 along the side surface of the roller 9. Thus, the incident position of the collimated beam onto the light-forming lens 22 and, consequently, the light intensity distribution of the line laser beam L can be adjusted.

Accordingly, the optical device 10 of the present exemplary embodiment can form the linear line laser beam L having even light intensity distribution.

In the present exemplary embodiment, the slits 631, which are provided in the second lens holder 6 for receiving the shafts 821 of the adjuster screws 82, have a larger dimension in the X-axis direction than the dimension in the Y-axis direction.

With this arrangement, the position of the second lens holder 6, which is kept from dropping off by the engagement of the shafts 821 of the adjuster screws 82 with the slits 631, can be appropriately adjusted in the X-axis direction with respect to the second connector block 7.

In the present exemplary embodiment, the first lens holder 4 is a hollow cylindrical component holding the collimating lens 21 thereinside. The second connector block 7, in which the outer circumferential surface 42 of the first lens holder 4 is slidably supported, is rotatable around the optical axis P.

With this arrangement, the line direction of the line laser beam L illuminating the workpiece W can be adjusted as desired. For instance, when the workpiece W is scanned in a predetermined scanning direction, the line direction of the line laser beam L can be aligned with a direction orthogonal to the scanning direction.

The optical measuring machine 100 of the present exemplary embodiment, which includes the above-described optical device 10, can illuminate the workpiece W with the linear line laser beam L having even light intensity distribution, thereby improving the measurement accuracy of the workpiece.

Modification(s)

It should be understood that the scope of the invention is not limited to the exemplary embodiment(s) but includes modifications, improvements and the like that are compatible with an object of the invention.

For instance, the slits 631, which are provided in the second lens holder 6 for receiving the shafts 821 of the adjuster screws 82 in the above exemplary embodiment, are replaced with holes penetrating through the second lens holder 6 in the Z-axis direction in some embodiments of the invention.

Alternatively, the second lens holder 6 is provided with neither the slits 631 nor the holes in some embodiments. In this case, the second lens holder 6 is configured to be engaged at least with the heads 822 of the adjuster screws 82 at peripheral portions thereof.

The second connector block 7, which is rotatable with respect to the first lens holder 4 around the optical axis P in the above exemplary embodiment, is fixed to the first lens holder 4 in some embodiments.

The optical device 10 of the invention, which is used for the optical measuring machine 100 in the exemplary embodiment, is not necessarily used for the optical measuring machine but is usable in various fields of the art as a device capable of forming a linear line laser beam having even light intensity distribution.

What is claimed is:

1. An optical device comprising:
   a light source configured to emit a laser beam;
   a collimating lens configured to convert the laser beam received from the light source into a collimated beam;
   a light-forming lens configured to convert the collimated beam received from the collimating lens into a line laser beam widened in a line direction orthogonal to an optical axis of the collimating lens;
   a first lens holder holding the collimating lens;
   a connector block supporting the first lens holder;
   a second lens holder supporting the light-forming lens;
   a pillar-shaped roller interposed between the connector block and the second lens holder and disposed along the line direction; and
   a pair of adjuster screws disposed across the optical axis in an orthogonal direction orthogonal to the optical axis and the line direction, the second lens holder and the connector block being fixed with each other by the adjuster screws, wherein
   mutually facing end faces of the connector block and the second lens holder are each provided with respective V-shaped grooves extending along the line direction, the V-shaped grooves being disposed with the roller being interposed therebetween, and
   the adjuster screws each comprise a head engaged with the second lens holder in a manner capable of relative movement in the line direction and a shaft screwed with the connector block.

2. The optical device according to claim 1, wherein
   the second lens holder is provided with holes or slits for receiving the shafts of the adjuster screws, and
   the holes or the slits each have a dimension in the line direction larger than a dimension in the orthogonal direction.

3. The optical device according to claim 1, wherein
   the first lens holder is a hollow cylindrical component internally holding the collimating lens, and
   the connector block slidably supports an outer circumferential surface of the first lens holder to be rotatable around the optical axis.

4. An optical measuring machine comprising:
   the optical device according to claim 1, the optical device irradiating the workpiece with the line laser beam;
   an image capturing unit configured to capture an image of a reflected light of the line laser beam reflected by the workpiece, and
   a measuring unit configured to measure a profile of the workpiece based on the image captured by the image capturing unit.

* * * * *